(12) United States Patent
Sano et al.

(10) Patent No.: US 6,189,798 B1
(45) Date of Patent: *Feb. 20, 2001

(54) THERMOSTAT DEVICE

(75) Inventors: Mitsuhiro Sano; Masanori Takahashi; Hidetoshi Sasaki; Yasuharu Uomori, all of Kiyose (JP)

(73) Assignee: Nippon Thermostat Co., Ltd., Kiyose (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/935,912

(22) Filed: Sep. 23, 1997

(30) Foreign Application Priority Data

Jul. 9, 1997 (JP) ................................... 9-184219

(51) Int. Cl.$^7$ ........................................ F01P 7/16
(52) U.S. Cl. ........................... 236/34.5; 236/53 A
(58) Field of Search .................. 236/34, 34.5, 93 A, 236/100

(56) References Cited

U.S. PATENT DOCUMENTS

| | | | | |
|---|---|---|---|---|
| 1,528,788 | * | 3/1925 | Rayfield | 236/34.5 |
| 2,454,141 | * | 11/1948 | Drapeau | 236/34.5 |
| 3,014,467 | * | 12/1961 | Middendorf et al. | 236/34.5 |
| 3,329,340 | * | 7/1967 | Lipscombe | 236/34.5 |
| 3,562,784 | * | 2/1971 | Lipscombe | 236/34.5 |
| 4,294,226 | * | 10/1981 | Feinberg | 236/93 A |
| 4,627,567 | * | 12/1986 | Thorn | 236/34.5 |

* cited by examiner

*Primary Examiner*—William E. Tapolcai
(74) *Attorney, Agent, or Firm*—Oblon, Spivak, McClelland, Maier & Neustadt, P.C.

(57) ABSTRACT

An object of the present invention is to provide a thermostat device which ensures a smooth slide without damaging the slide function by immersion of a cooling liquid, increase flexibility of a circulation channel design by miniaturization, and materializes a hand-operated opening and closing of a valve. In order to solve the problems, the thermostat device 1 in which a heat responding element (wax 3) to expand and shrink by sensing the heating or cooling of the circulating liquid in the circulation channel, is embedded, a sliding member (piston rod 9) is slid in accordance with volume changes caused by the expansion and shrinkage of the expansion element to open and close the valve body, is structured that a sensor case 2 which embeds the responding element is placed in the circulation channel of the circulating liquid, and the sliding member is placed outside of the circulation channel of the circulating liquid.

7 Claims, 9 Drawing Sheets

FIG.10(b) [OPENED STATE]

FIG.10(a) [CLOSED STATE]

THERMOSTAT DEVICE

BACKGROUND OF THE INVENTION

1. Field of the Invention

The present invention relates to a thermostat device provided in a circulation channel, embeds a heat responding element which expands and shrinks by detecting the heating or cooling of a circulating liquid, slides a sliding member in accordance with a volume change resulting from the expansion and shrinkage of the heat responding element and opens and closes a valve having a valve shaft.

2. Description of the Related Art

In general, a thermostat device arranged in a cooling system of an internal-combustion engine and the like is configured that it provides a sensor case which embeds a heat responding element to expand and shrink by detecting a temperature change of a cooling liquid filled in a circulation channel of the cooling system, opens and closes a valve in accordance with a volume change resulting from the responding and shrinkage of the heat expansion element, and maintains the cooling liquid at a designated temperature.

Figure 11:
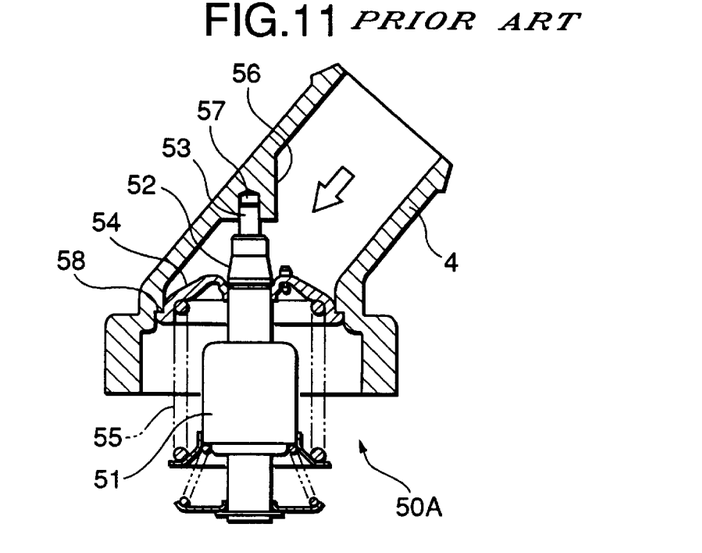
FIG. 11 is a cutaway side elevational view of the circulation channel placing a conventional thermostat device in it.

FIG. 11 is a cutaway side elevational view of a circulation channel 4 which provides a thermostat device 50 having such configuration, as described in Japanese patent Laid-Open No. 7-301362. The thermostat device 50 in the figure has a pocket-type valve, and in more detail, it is consisted of a sensor case 51 which fills wax having a heat responding property, a piston guide 52 attached to a side of the sensor case 51, a piston rod 53 inserted into the piston guide 52 in a slidable manner, a diaphragm (not shown) inserted between the piston guide 52 and the sensor case 51, a valve body 54 fixed to the piston guide 52, and a coil spring 55 winding around the sensor case 51.

The thermostat device 50 having such configuration is positioned in the circulation channel 4 by being firmly fitted the tip end portion of the piston rod 53 into a fitting hole 57 bored in a flange portion 56 arranged in the circulation channel 4.

The thermostat device 50 arranged in the circulation channel 4 has following functions. When the temperature of a cooling liquid filled in the circulation channel 4 rises, the wax (not shown) filled in the sensor case 51 is expanded by heating, which pushes up the diaphragm to cause a deformation. By the deformation of the diaphragm, a semi-free flowing liquid (not shown) filled in the piston guide 52 is pressed toward the piston rod 53 to give the piston rod 53 a pushing force.

As described above, the tip end of the piston rod 53 is firmly fitted into the fitting hole 57 of the flange portion 56 formed in the circulation channel 4, so it pushes back the sensor case 51 against a resilient force of the coil spring 55, helped by responding of the heat expansion wax. Thus, the piston rod 53 moves the sensor case 51 downwards in the figure in accordance with the rise in temperature of the cooling liquid. Accompanied by the move, the valve body 54 moves to actuate an open-close portion 58 of the circulation channel 4 to open direction, making possible to allow the cooling liquid to pass in the direction shown by the arrow in the figure.

Figure 12:
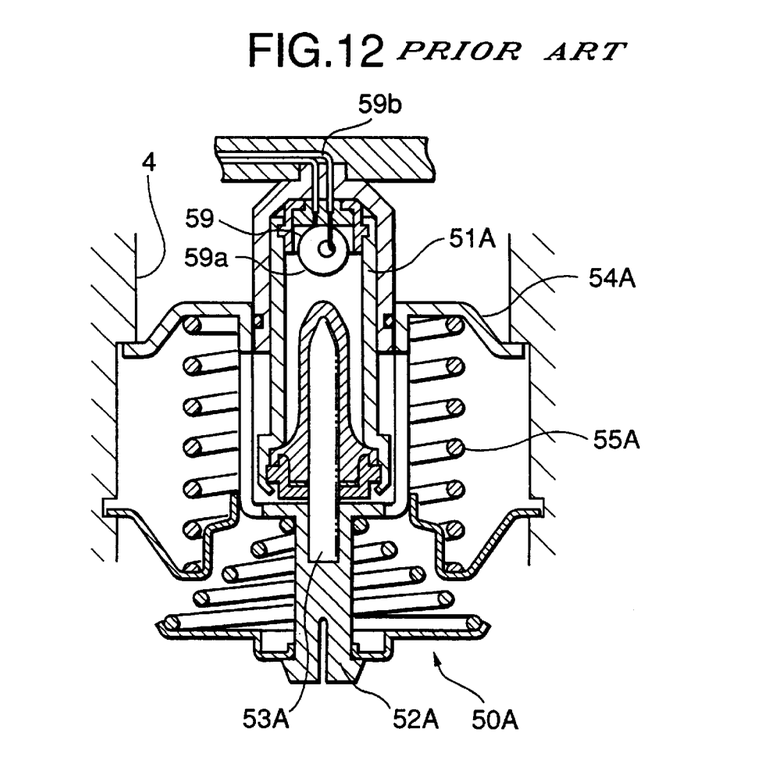
FIG. 12 is a cutaway side elevational view of the circulation channel in which places a second thermostat device having a heating element in the sensor case.

FIG. 12 is a cutaway side elevational view of the circulation channel 4 which provides another conventional thermostat device 50A. The thermostat device 50A shown in the figure provides, similar to the thermostat device 50 above described, a sensor case 51A which embeds a heat responding wax to expand or shrink by detecting the change in temperature of a cooling liquid filled in the circulation channel 4 in the cooling system, and has a function to keep the cooling liquid in a designated temperature by opening and closing a valve body 54A in accordance with the volume change resulting from the expansion or the shrinkage of the wax. But on the other hand, it is a different device from the previously described device in a respect of having another function that the device provides a heating element 59 in the sensor case 51A, the wax in the sensor case 51A is expanded by heating with the heating element 59, even when the cooling liquid filled in the circulation channel 4 is in low temperatures and the valve 54A is forcibly opened to make it possible to allow the cooling liquid to pass.

As explained above, the thermostat devices 50, 50A adopting the conventional poppet type valve bodies 54, 54A are both arranged with sensing portions such as sensor cases 51, 51A to detect temperature of the cooling liquid in the circulation channel 4 and slide portions of the piston rods 53, 53A to open and close the poppet type valve bodies 54, 54A. As the slidable piston rods 53, 53A, particularly, are always put in the cooling liquid, in some cases, the cooling liquid comes in between the piston rods 53, 53A and the piston guides 52, 52A resulting to harm the sliding function, or some ingredients may corrode these members to damage the functions.

Moreover, the cooling liquid in the circulation channel can not directly engage with the sensor case, disturbed by the poppet type valve bodies, that causes the temperature sensibility of the sensor case dull and the responsivity of the thermostat device poor.

When in such situation, a smooth flow of the cooling liquid in the circulation channel 4 can not be expected and at the same time, operation of the internal-combustion engine and the like may be seriously affected.

And as the thermostat devices 50, 50A are using the poppet type valve bodies 54, 54A which provide the sensing portion and the sliding portion in the circulation channel 4, flow resistance of the cooling liquid becomes big, and an increase of the diameter of the valve bodies 54, 54A is necessary to obtain a designated amount of flow. Then, size reduction of the thermostat devices 50, 50 themselves becomes difficult, accordingly, the miniaturization of a device such as the internal-combustion engine and the like can not be achieved.

As bleeding air to fill the cooling liquid in the circulation channel 4 is carried out by operating a jiggle valve (not shown) of the thermostat, the filling efficiency is quite poor. And in case that the valve bodies 54, 54A of the thermostat devices 50, 50A are in trouble, the circulation channel 4 can not be opened or closed from the outside.

Further more, for the thermostat device 50A which has a function to forcibly open the valve body 54A through heat expansion of the wax in the censor case 51A by the action of a heating element 59, the hermeticity of an electrode 59a of the heating element 59 and a shield wire 59b for conducting current must be strictly controlled because they are placed in the circulation channel 4. When an accident such as contact failure of the electrode 59a due to leakage of the cooling liquid or a break in the shield wire 59b is occurred, the function can not be performed and the replacement work requires much expense in time and effort.

In considering these disadvantages, the thermostat device of the present invention aims to provide a thermostat device that the sliding function is not impaired by immersion of the cooling liquid so that a good slidability is ensured, the design flexibility of the circulation channel can be improved through miniaturization, and an open-close operation of the valve can be manually performed.

SUMMARY OF THE INVENTION

In order to solve the disadvantages above described, in a thermostat device which imbeds a heat responding element to expand or shrink by sensing heating and cooling of a circulating liquid in a circulation channel, slides a slide member in accordance with a volume change resulting from the responding and shrinkage of the heat expansion element, and opens or closes the valve body, the thermostat device of the present invention provides a sensor case which imbeds the heat expansion element in the circulation channel of the circulating liquid, and the sliding element in the outside of the circulation channel of the circulating liquid.

Preferably the valve body can open and close the circulation channel through turning of a valve shaft to have a function to control the amount of flow of the circulating liquid, a valve seat of the valve body is formed in a shape which relates to the turning of the valve body, and the valve body is to be fixed on an inner wall of the circulation channel.

The sliding member is equipped with a slidable piston rod and the head of the piston rod is attached to a cam member which is fitted to the valve shaft of the valve body and the valve shaft rotates in accordance with the slide of the piston rod.

The valve shaft is configured to have an supplemental turning means to turn manually and an angle detection means to detect a closed angle of the valve body.

The sensor case which embeds the heat responding element is configured to have a means for a supplementary external heat source to expand or shrink the heat responding element from an external heat regulation source.

BRIEF DESCRIPTION OF THE DRAWINGS

FIG. 1 shows a first embodiment of a thermostat device relating to the present invention, and a cutaway plane view of the thermostat device placed in a circulation channel of an internal-combustion engine and the like;

FIG. 3 are movement explanatory views of a piston rod and the cam member relation.

FIG. 10 are cutaway side elevational view of another embodiment using other valve body having a valve shaft.

DETAILED DESCRIPTION OF THE PREFERRED EMBODIMENT(S)

An embodiment of a thermostat device of the present invention having such configuration will be explained based on the attached drawings.

Figure 1:
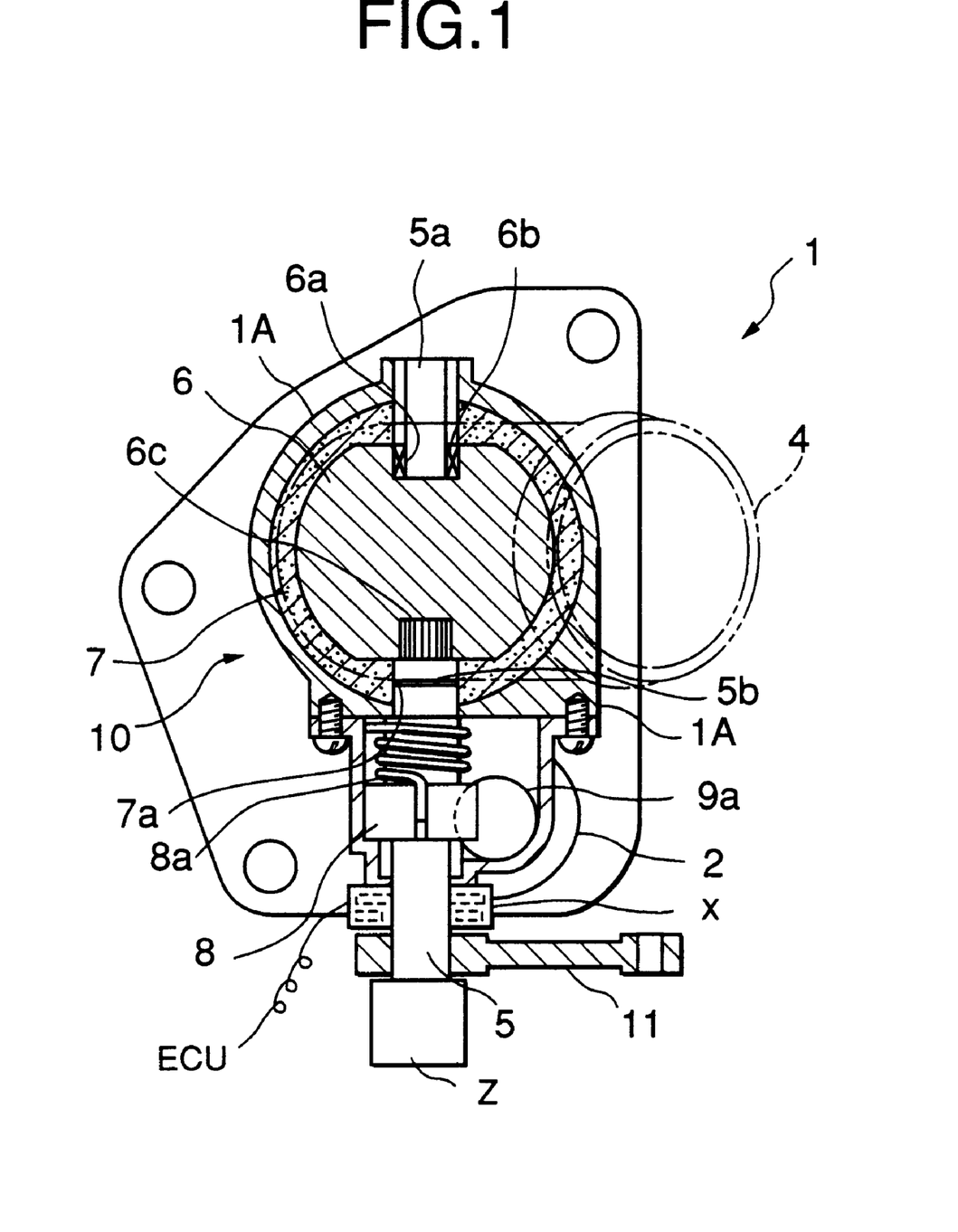
Figures 2A, 2B:
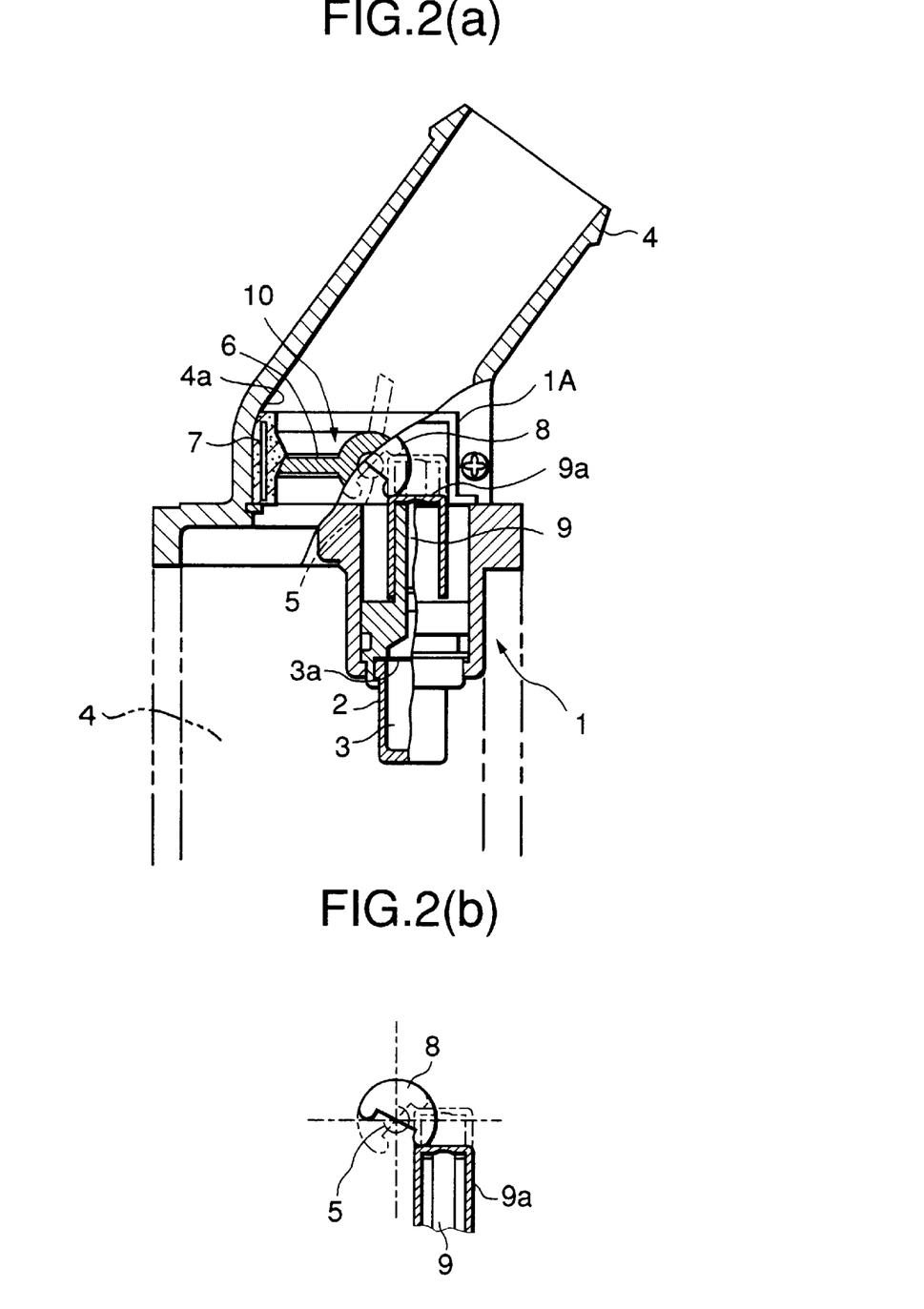
FIG. 2(a) is a side elevational view of FIG. 1.
FIG. 2(b) is an explanatory view of the action of a cam member.

FIG. 1 shows a first embodiment of the thermostat device relating to the present invention and is a cutaway plane view of the thermostat device placed in a circulation channel of an internal-combustion engine and the like. FIG. 2(a) is a side elevational view of FIG. 1, and FIG. 2(b) is an explanatory view of the action of a cam member.

The thermostat device 1 relating to the present invention, which is shown in the figure, embeds a heat responding wax 3 to expand or shrink in detecting heating or cooling of a circulating liquid in a sensor case, and slides a piston rod 9 which forms a sliding member in accordance with volume changes resulting from expansion and shrinkage of the wax 3 to perform opening and closing of a valve body 6.

And the sensor case 2 which embeds the wax 3 is placed in the circulation channel 4 of the circulating liquid and the piston rod 9 which is the slide member is placed outside of the circulation channel 4 of the circulating liquid.

The valve body 6 is detachably supported by one valve shaft (supporting shaft) 5a and placed to enable to open and close the circulation channel 4 by the turning of the other valve shaft (torque shaft) 5, forming a butterfly valve 10 which has a function to control the flow amount of the circulating liquid.

Figure 9:
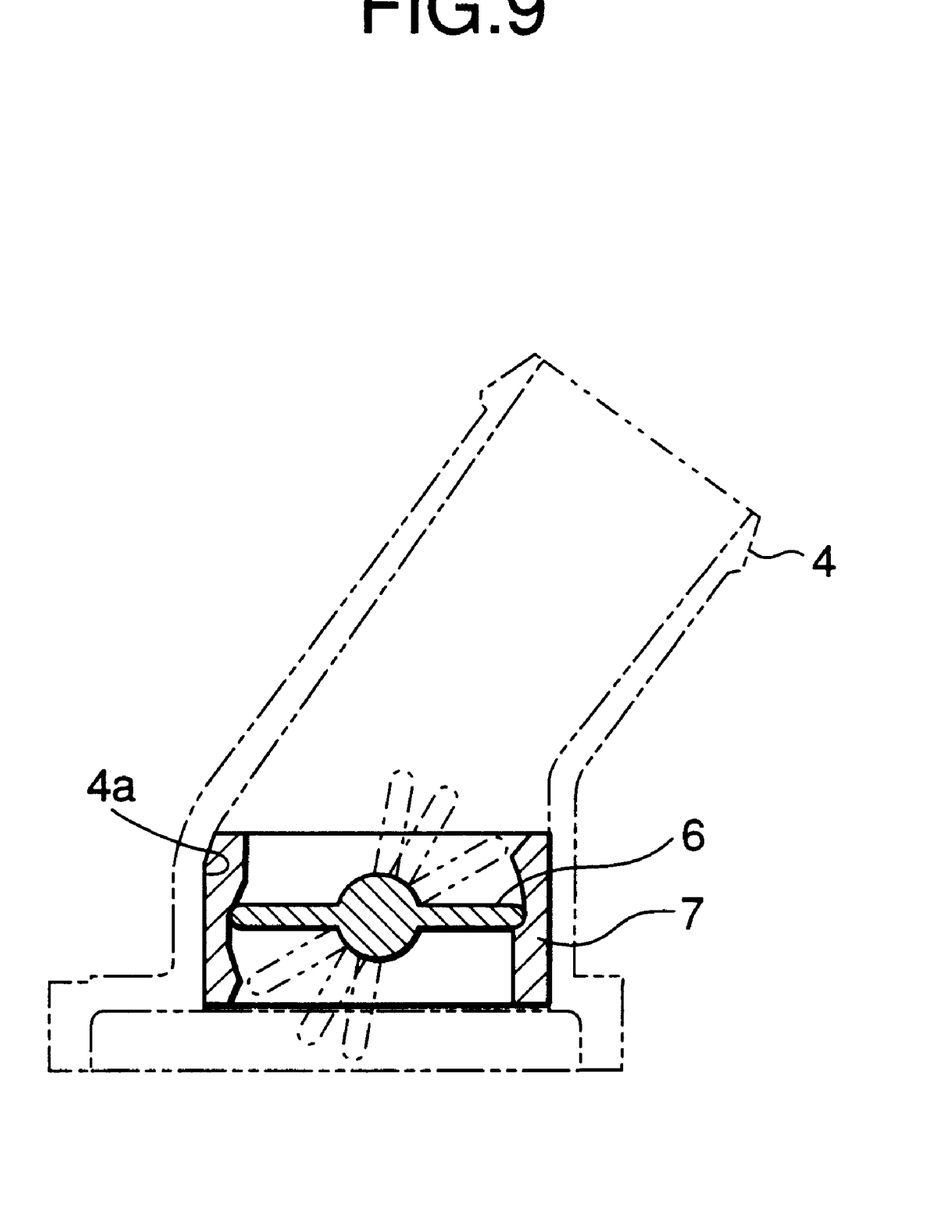
FIG. 9 is a side sectional view explaining a placement of a seal member (valve seat)

A seal member 7 which is a valve seat of the butterfly valve 10, is made in a shape following the locus of turning movement of the periphery of the valve body 6, when the valve body 6 turns around the valve shafts 5, 5a as the turning shaft, as shown in FIG. 9, is firmly fixed on an appropriate position of the inside wall 4a of the circulation channel 4.

The head of the piston rod 9 is attached to a cam member 8 fitted to the other valve shaft (torque shaft) 5 of the butterfly valve 10 through a retainer 9a and turns the valve shaft (torque shaft) 5 accompanied by a slide movement of the piston rod 9.

The valve shaft 5 (torque shaft) is provided with a manual lever 11 which is a supplementary turning means to enable to turn by a hand operation, and an angle sensor X which is an angle detecting means to detect closed angles of the butterfly valve 10.

The sensor case 2 which embeds the wax 3 is provided with an electrode 20a and a heat-regulation element 20 by shield wires 20b, which is an external supplemental heat-regulation source means to expand or shrink the wax 3, and an external piping 30 by an outside circulating liquid.

Figure 10A:
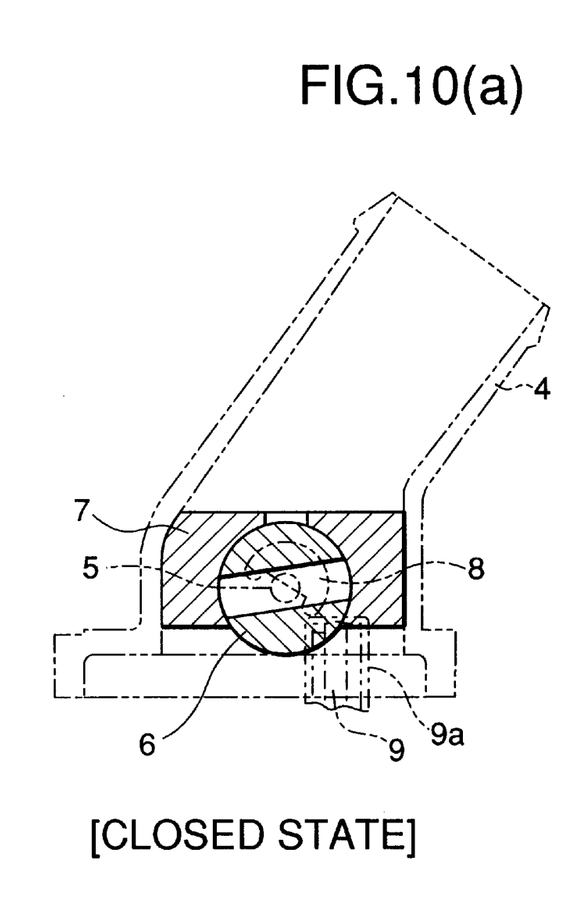
FIG. 10(a) shows a closed state of the valve body.
Figure 10B:
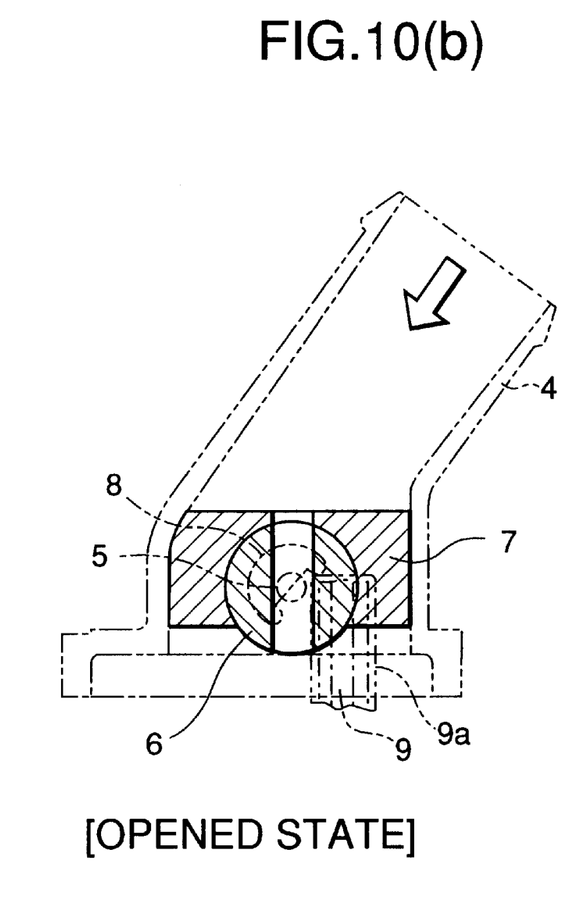
FIG. 10(b) shows an opened state.

Incidentally, the valve body 6 explained in the embodiment is explained as the butterfly valve 10, but any valve such as a rotary valve shown in FIG. 10 or a ball valve can be available, which turns the valve body 6 by the valve shaft 5 and controls flow amount of the circulating liquid. The choice of which valve to use may be determined by conditions such as the circulation channel 4 in which the valve body 6 is placed or amount of the flow.

The butterfly valve 10 is explained here.

The butterfly valve 10 of the present embodiment shown in FIG. 1 and FIG. 2 is used for circulating cooling of a water-cooled internal-combustion engine, and is placed in the circulation channel of a cooling liquid. The valve body 6 of the butterfly valve 10 uses the sensor case 2 having a piston rod 9 as a torque drive source.

The butterfly valve 10 has the torque shaft projecting in a direction of the diameter of the ring shaped valve body 6, which is the other valve shaft 5 held by a main valve body 1A in a turnable manner as shown in the figures, and serves as a flow amount control valve for the cooling liquid passing through the circulation channel 4 by opening and closing of the ring shaped valve body 6.

A bearing portion supporting the valve shaft 5 which is projecting from the center of the valve body 6 towards the valve main body 1A, to turn the valve body 6, is formed on the valve main body 1A. Further, a bearing portion supporting the support shaft of the valve shaft 5a which is projecting from the valve main body 1A towards the center of the valve body 6, to detachably support the valve body 6, is formed on the valve body 6.

The valve body 6 of the butterfly valve 10 takes a ring shaped figure which interrupts the circulating channel 4 and fixes the inserted valve shaft 5 (torque shaft). And a bored hole 6a to turn the valve body 6 is formed in the valve body 6 to make the valve body 6 turnable by supporting the inserted valve shaft (support valve) 5a.

A bearing 6b, the bearing member to make the valve body 6 turnable, using the valve shaft (support valve) 5a which is protruding from the valve main body 1A, as a rotation shaft, is firmly buried in the bored hole 6a.

As the valve shaft (support shaft) Sa is made in a protruding state of the valve main body with a hydraulic pressure processing or a mechanical processing such as cutting and the like, there is no possibility of leaking the liquid from the place in question even when a pressure of the liquid passing through the circulation channel 4 rises. Incidentally, the bearing 6b is used as a bearing member in the present embodiment, other bearing member such as a bush and the like which have a good rolling function can be used.

By replacing with such valve body 6, it becomes possible to miniaturize the valve body when compared with a conventional valve body and the miniaturization can be achieved even when compared with the butterfly valve 10 having the same flow amount.

Next, the sensor case 2 which is a driving source of the butterfly valve 10 thus constructed and a driving manner of the butterfly valve 10 by the sensor case 2 will be explained.

The sensor case 2 shown in FIG. 1 and FIG. 2 embeds the wax 3 which is a heat sensitive portion, and the expansion and shrinkage of the wax 3 pushes up a diaphragm 3a in the sensor case. The push up of the diaphragm 3a causes a slide of the piston rod 9.

A retainer 9a is capped to a head of the piston rod 9, as shown in FIG. 2(b), to prevent unbalanced loading and to expand the loading area and positioned to attach to the cam member 8 fitted to the valve shaft (torque shaft) 5.

As one end portion of the valve shaft (torque shaft) 5 is inserted and fixed into the bored hole 6c formed in the valve body 6, when the piston rod 9 slides, the head of the piston rod 9 turns the cam member 8 to turn the valve body 6. And the manual lever 11 of the supplemental means for the turn is fixed on the other end portion of the valve shaft (torque shaft) 5 to enable the manual turning of the valve shaft (torque shaft) 5.

Further more, the valve shaft (torque shaft) 5 is provided with the angle sensor X which is an angle detecting means to detect closed angles of the valve body 6 and an actuator Z which is a compensation means for opening and closing to compensate a closed angle of the valve body 6.

The angle sensor X of the angle detecting means detects the closed angle of the valve body 6 and wires the detected value to a electronic control unit ECU which will be later explained.

A solenoid or a motor is used for the actuator Z of the compensation means for opening and closing. At the start to open the valve that requires torque, the opening of the valve body 6 is usually operated by expansion of the wax 3, but during from half open to full open of the valve body, the operation of the actuator Z with the expansion of the wax 3 or the operation of the actuator Z without the expansion of the wax 3 makes a smooth circulation of the cooling liquid.

Incidentally during the half stage of opening of the valve body 6, the valve body 6 can be opened at will by output signals from the electronic control unit ECU.

A spring 8a of which one end portion is fixed on the valve main body 1A and the other end portion is fixed in a spring hold groove 8b formed in the cam member 8 is wound, the spring 8a is wound to energize the turn toward a closed state of the valve body 6 which turns toward an opened state through extension of the piston rod 9 of the sensor case 2.

Between the valve body 6 which turns inside the valve main body 1A and the valve main body 1A, the seal member 7 of the valve seat is fixed at an appropriate position on an inner wall 4a of the valve main body 1A, as shown in FIG. 9, the seal member 7 has a function of filling a clearance created between the valve body 6 and the valve main body 1A, that is a function to completely block the cooling liquid when the valve body 6 is in a closed state. A convex shaped seal member 7a is formed fitting with a drain groove Sb formed in a concave shape on the peripheral of the valve shaft (torque shaft) 5 at a contact surface of the seal member 7 with the valve shaft (torque shaft) 5 to maintain water tightness of the butterfly valve 10.

The seal member 7 is made of a high heat resistant and abrasion resistant rubber or resin, and is formed in a shape to follow the locus of turning of the periphery of the valve body 6, when the valve body 6 turns arounf the valve shaft 5, 5a as a supporting shaft.

And as the seal member 7 is formed with a different member from that of the circulation channel 4 and is formed in a shape to follow the locus of the turn, adjustment of fixing position or replacement of the shape of the seal member into a straight type enable to change the flow amount characteristic of the cooling liquid even with the same closing angle of the valve body 6.

The action of the thermostat device having such configuration will be explained.

The wax 3 in the sensor case 10 which is placed in the circulation channel 4 which is connected with the thermostat device 1 is expanded by a temperature rise of the cooling liquid. The expanded wax 3 pushes up the diaphragm 3a and elongates the piston rod 9 shown in FIG. 1 and FIG. 2, working together with the pushing up.

Figure 3A:
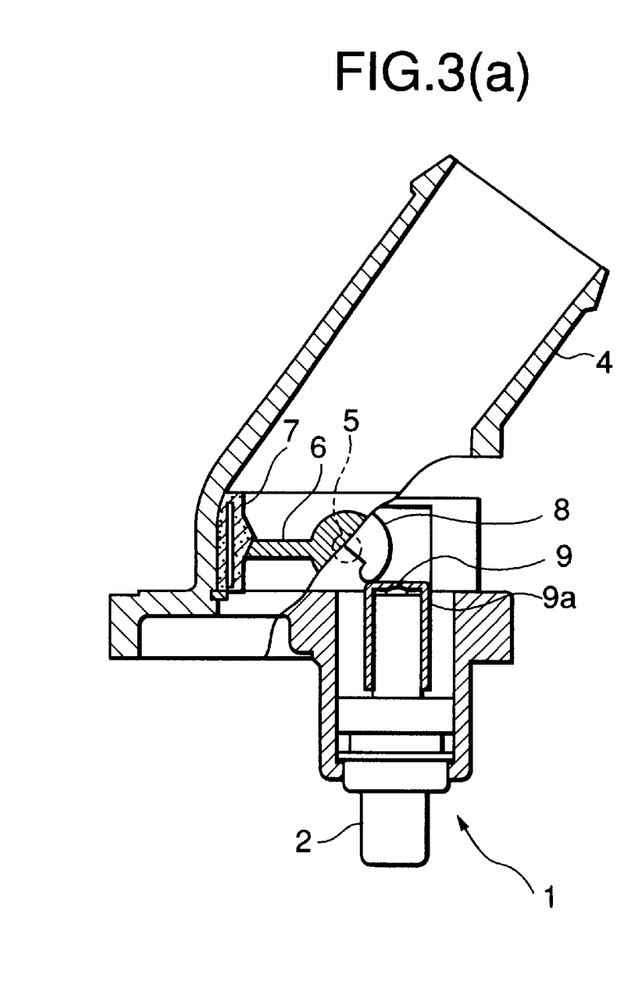
FIG. 3(a) shows a descending state of the piston rod.
Figure 3B:
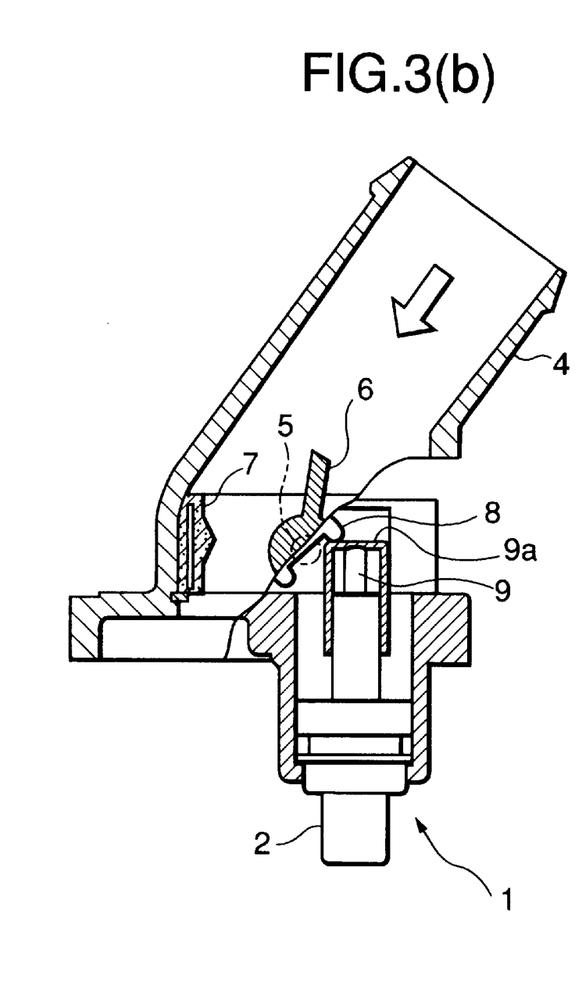
FIG. 3(b) is an explanatory view of an ascending state of the piston rod.

The head of the piston rod 9 is capped with the retainer 9a and is attached to the cam member 8 fitted in the valve shaft (torque shaft) 5, therefore when the piston rod is elongated, it rotates the valve shaft (torque shaft) 5 to make a ascending state shown in FIG. 3(b) from a descending state in FIG. 3(a). By changing to the ascending state, the valve body 6 changes from a closing state to an opening state and allows the cooling liquid to pass toward an arrow direction shown in FIG. 1 in the circulation channel 4.

Incidentally, the shape of the cam member 8 fitted in the valve shaft (torque shaft) 5 is formed to match the flow amount of the cooling liquid passing through the circulation channel 4, but by changing the shape, it is possible to change the flow amount of the cooling liquid.

The valve body 6 performs opening and closing through turning of the valve shaft (torque shaft) 5, triggered by temperature rise of the cooling liquid passing through the circulation channel 4, while the angle sensor X provided on the valve shaft (torque shaft) 5 detects a closed angle of the valve body i.e. a rotation angle of the valve shaft (torque shaft) 5, and wires the detected data to the linked electronic control unit.

Figure 4:
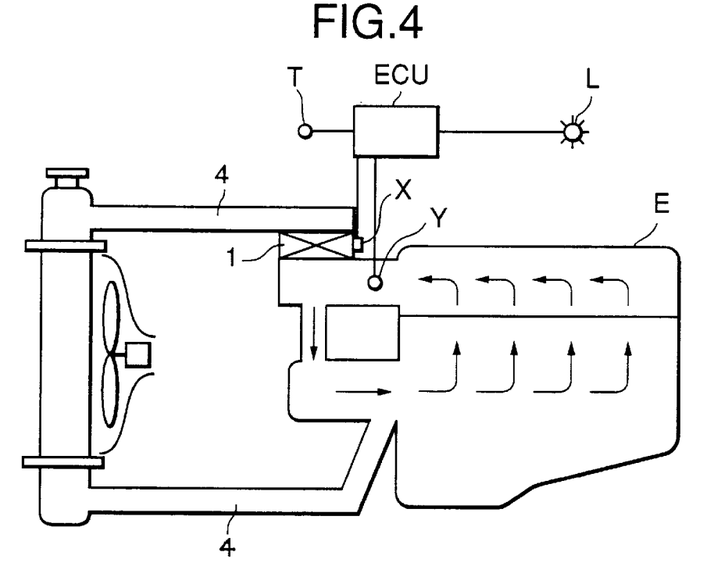
FIG. 4 is a diagrammatic view of the circulation channel which places the thermostat device of the present invention.

The electronic control unit ECU compares a variety of data on the internal-combustion engine E, in addition to closing angles of the valve body 6, as shown in FIG. 4, data detected by well known method, such as temperatures of the cooling liquid detected by a temperature sensor Y in the circulation channel, number of revolution of the internal-combustion engine E, and outside-air temperatures detected by an outside-air temperature sensor T, with the memory contents stored in advance in the internal memory, and checks several spots of the internal combustion engine at a diagnostic section.

For instance, in an internal-combustion engine E which is provided with the thermostat device that the operation start temperature of the valve body of the thermostat device 1 is 80° C., and the temperature in full opened state is 95° C., when the temperature sensor Y sends an information that the temperature of the cooling liquid is 90° C. and the angle sensor X sends data that the angle of the valve body is in an opened state, to the electronic control unit ECU, the electronic control unit ECU compares the information with the data on the thermostat device 1 stored in advance (the operation start temperature of the valve body is 80° C., the full opened temperature is 95° C.). In a case that the unit judges the thermostat device 1 faulty as a result of the comparison, the electronic control device ECU outputs to an information means L such as an indicator light, a buzzer, or a voice output device.

Incidentally, the example above described is only an example, and it is a matter of course that a plenty of information (for instance, a damage information which corresponds a break down data, or information on specifications) is stored and preserved in the memory section and diagnostic section of the electronic control unit ECU, assuming various situations, to easily grasp the assumed situation, and to enable on-target response.

The information means L is preferably placed near various meters on a dashboard where is a place to inform troubles to operators with reliability.

Figure 5:
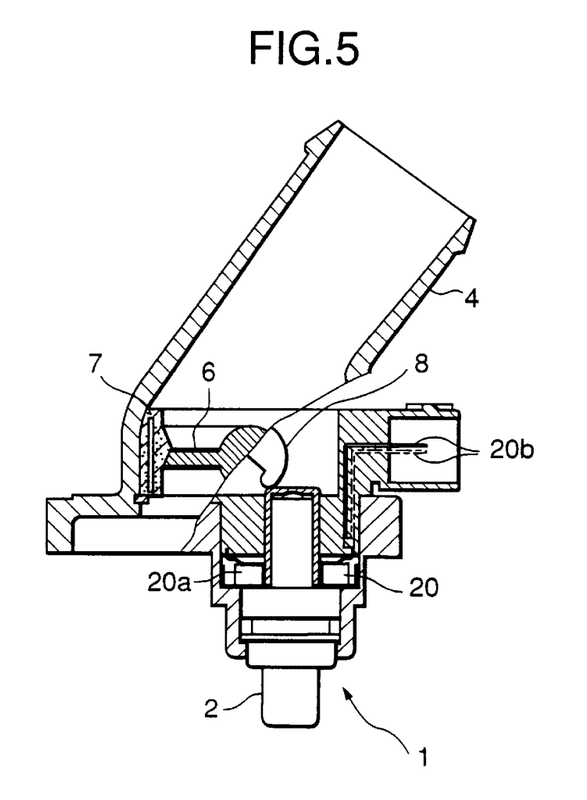
FIG. 5 is a cutaway side elevational view to explain the state of adding a heat-regulation element which is an external heat-regulation source, to a sensor case.

FIG. 5 is a cutaway side elevational view of the thermostat device 1 explained above in which a heat-regulation element 20, an external heat regulation-source such as PTC, Peltier element is assembled in the sensor case 2. Such thermostat device 1 is applicable as having an effective function, when the temperature of the cooling liquid passing through the circulation channel 4 does not rise due to insufficient warm up of the internal-combustion engine, and the valve body 6 of the thermostat device is required an operation toward opening. As the electrode 20a and the shield wire 20b of the heat-regulation element 20 are placed in the outside of the circulation channel 4, accident such as short caused by immersion of the cooling liquid can be prevented.

Figure 6:
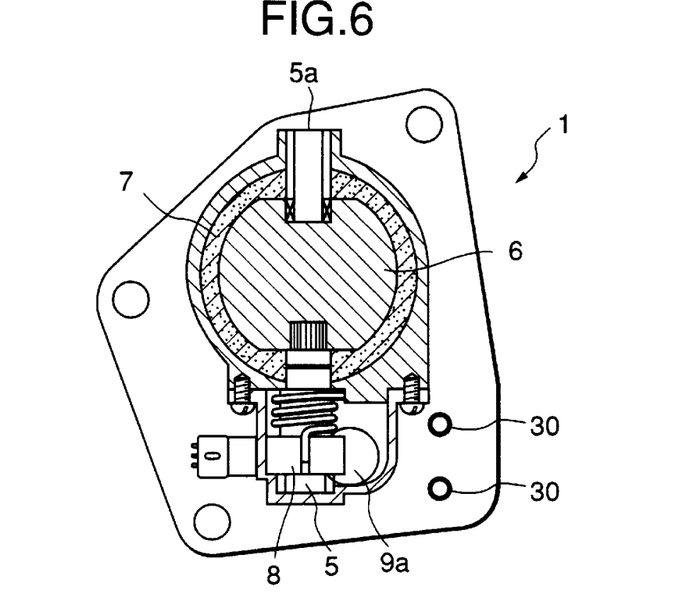
FIG. 6 is a plane view to explain the state of adding a piping of a window washer and the like to the censer case.
Figure 7:
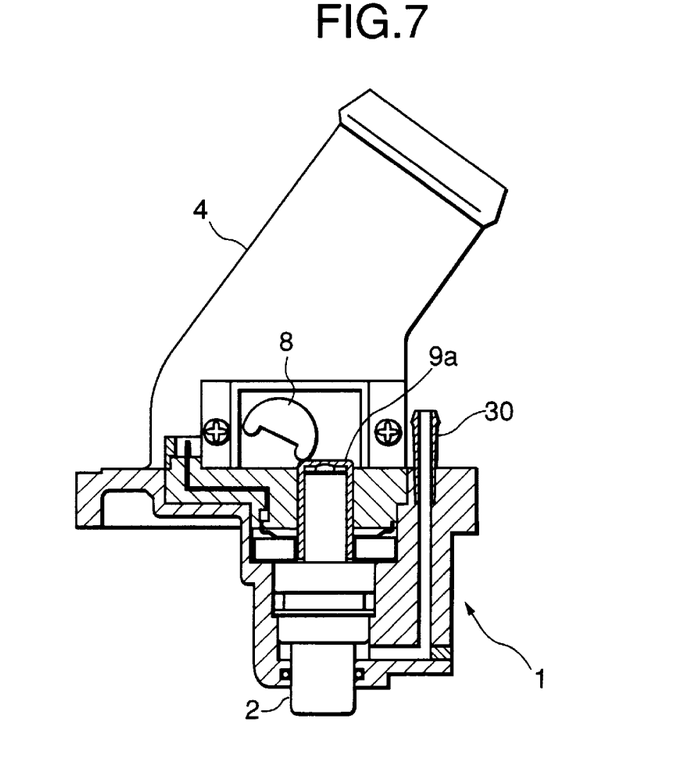
FIG. 7 is a partial cutaway side elevational view of FIG. 5.

FIG. 6 and FIG. 7 are a plane view and a cutaway side elevational view of the thermostat device 1 that an external piping 30 for such as window washer liquid is incorporated in the sensor case 2. In the thermostat device 1, by making circulation channel to connect the external piping 30 with a storing tank (not shown) of the window washer liquid, it becomes possible to add a function that wax 3 is cooled and the valve can be intentionally closed, and the window washer liquid is warmed by the cooling liquid so that snow or ice on a windshield can be easily removed in winter.

Figure 8:
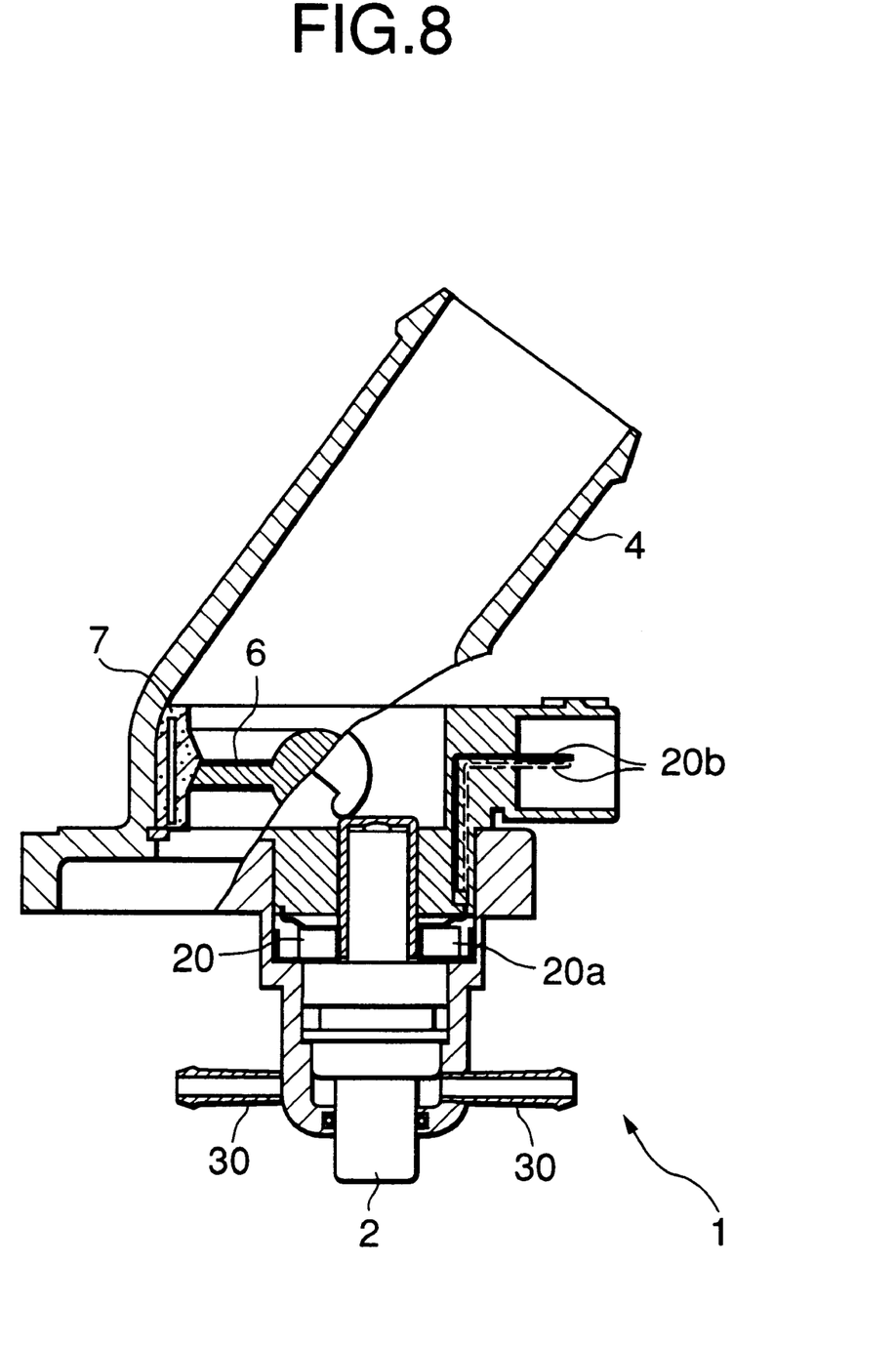
FIG. 8 is a side elevational view showing another embodiment of FIG. 6.

FIG. 8 is another embodiment of the thermostat device 1 that the external piping 30 shown in FIG. 6 and FIG. 7 is incorporated in the sensor case 2. As shown in the figures, the external piping can be provided quite freely.

As shown in FIG. 5 to FIG. 8, the combination of the thermostat device 1 with the heat-regulation element 20 and the external piping 30, enable to heat or cool the thermostat device 1 with not only the cooling liquid in the circulation channel 4, as described above, and the multifunctional thermostat device 1 can be thus obtained.

As the Pertier element of the heat-regulation element 20 has a function of both heat and cooling by connecting the polarity in reverse, the use of the heat-regulation element 20 increases the design flexibility of the thermostat device 1.

The thermostat device of the present invention explained above shows the following effects.

(1) As the thermostat device has a configuration that the sensor case embedding the heat responding element is placed in the circulation channel of the circulating liquid and the sliding member is placed outside the circulation channel of the circulating liquid, the sliding member such as the piston rod does not directly contact with the cooling liquid, and troubles such as corrosion of the sliding member caused by immersion of the cooling liquid or ingredients in the cooling liquid can be avoided.

(2) Replacement of the poppet valve which has a large flow resistance in the circulation channel by the valve which has a valve shaft and controls flow by turning the valve shaft, makes it possible to decrease in size to obtain the same flow amount obtained by the poppet valve. Then, the load of a water pump for sending the cooling liquid in the circulation channel with pressure can be decreased, size of the radiator can be reduced and reduction in size of the device itself can be materialized.

(3) The replacement of the poppet valve by the valve having a valve shaft which is turned to control a flow rate improves the heat sensibility of the sensor case and improvement in responsivity of the thermostat device can be achieved, because the cooling liquid of the circulation channel can be directly contacted to the sensor case from the opened valve body.

(4) When the sensor case is heated by a heat-regulation element such as PTC element or Pertier element in addition to the cooling and heating of the sensor case by the cooling liquid filled in the circulation channel, the wiring to these heating elements can be installed without passing through the circulation channel and troubles of such as a short circuit caused by a leakage of water.

(5) In addition to the cooling liquid and the heat-regulation element for heating and cooling of the sensor case, adding of a piping for the window washer liquid to the sensor case, can intentionally close the valve by cooling the wax and can remove ice and snow on a windshield glass in winter. Moreover the sensor case itself can be cooled by installing a piping for car air conditioner or by connecting the polarity of Pertier element of the heating element in reverse to the sensor case.

(6) The angle sensor is attached to the valve shaft to detect closed angles of the valve body, the ECU compares and carries out diagnosis the data sent from a well-known temperature sensor arranged in the circulation channel, number of revolution of the internal-combustion engine, and an outside air temperature sensor and outputs by informing means so that the driver can exactly grasp the working condition of the engine to drive in considering the fail-safe system of the internal-combustion engine.

(7) The provision of the manual lever to the valve shaft enables to operate from outside of the thermostat device, enables to open and close the thermostat device in case of a trouble, and enables to improve a filling ability by opening and closing operation of the manual lever when new cooling liquid is filled into the circulation channel or is exchanged.

What is claimed is:

1. A valve device with a thermostat, comprising:
    a valve body configured to control a flow rate of a circulating liquid in a circulation channel and having a valve shaft to which a cam is fitted and via which the valve body is rotated to open and close the circulation channel;
    a heat responding element which expands or shrinks by sensing a temperature of the circulating liquid;
    a sensor case which contains the heat responding element and which is located inside the circulation channel;
    a sliding member placed outside the circulation channel and comprising a slidable piston rod which engages with the cam and the heat responding element such that expansion and shrinkage of said heat responding element cause a sliding motion of said piston rod and such that the sliding motion causes a rotation of the valve body via the valve shaft;
    a valve seat provided on an inside wall of the circulation channel, said valve seat being formed to substantially conform to a locus of the rotation of said valve body; and
    a supplemental turning unit to turn said valve shaft.

2. A valve device with a thermostat, comprising:
    a valve body configured to control a flow rate of a circulating liquid in a circulation channel and having a valve shaft to which a cam is fitted and via which the valve body is rotated to open and close the circulation channel;
    a heat responding element which expands or shrinks by sensing a temperature of the circulating liquid;
    a sensor case which contains the heat responding element and which is located inside the circulation channel;
    a sliding member placed outside the circulation channel and comprising a slidable piston rod which engages with the cam and the heat responding element such that expansion and shrinkage of said heat responding element cause a sliding motion of said piston rod and such that the sliding motion causes a rotation of the valve body via the valve shaft;
    a valve seat provided on an inside wall of the circulation channel, said valve seat being formed to substantially conform to a locus of the rotation of said valve body; and
    an angle detector which detects an angle of said valve body when the valve body closes the circulation channel.

3. The valve device according to claim 1, further comprising an angle detector which detects an angle of said valve body when the valve body closes the circulation channel.

4. A valve device with a thermostat, comprising:
    a valve body configured to control a flow rate of a circulating liquid in a circulation channel and having a valve shaft to which a cam is fitted and via which the valve body is rotated to open and close the circulation channel;
    a heat responding element which expands or shrinks by sensing a temperature of the circulating liquid;
    a sensor case which contains the heat responding element and which is located inside the circulation channel;
    a sliding member placed outside the circulation channel and comprising a slidable piston rod which engages with the cam and the heat responding element such that expansion and shrinkage of said heat responding element cause a sliding motion of said piston rod and such that the sliding motion causes a rotation of the valve body via the valve shaft;
    a valve seat provided on an inside wall of the circulation channel, said valve seat being formed to substantially conform to a locus of the rotation of said valve body; and
    a supplemental external heat-regulator having a heat source which causes the expansion or shrinkage of said heat responding element.

5. The valve device according to claim 1, further comprising a supplemental external heat-regulator having a heat source which causes the expansion or shrinkage of said heat responding element.

6. The valve device according to claim 2, further comprising a supplemental external heat-regulator having a heat source which causes the expansion or shrinkage of said heat responding element.

7. The valve device according to claim 3, further comprising a supplemental external heat-regulator having a heat source which causes the expansion or shrinkage of said heat responding element.

* * * * *